2,948,653

ITACONIC ACID DIESTER ADDUCTS AS PLANT FUNGICIDES

Abraham Bavley, Brooklyn, and Bryce E. Tate, Kew Gardens, N.Y., assignors to Chas. Pfizer & Co., Inc., New York, N.Y., a corporation of Delaware No Drawing. Filed July 2, 1957, Ser. No. 669,470

3 Claims. (Cl. 167—22)

This invention relates to a new and useful class of compounds, the method of producing the same, and to compositions containing a compound of this invention as the essential active ingredient. More particularly, the compounds of the present invention are adducts of certain halomethanes (particularly bromotrichloromethane) and itaconic acid diesters and are particularly valuable because of their fungicidal activity.

The compounds of the present invention are 1:1 adducts of bromotrichloromethane and an itaconic acid diester whose alcohol residues are lower alkyl groups containing from 1 to 4 carbon atoms. Although other itaconic acid diesters than those defined above produce adducts with bromotrichloromethane the fungicidal activity of such adducts is not as extensive. When the alkyl groups are changed in the series from methyl to butyl, the higher temperature required for distillation of the higher members causes increased conversion of the adduct to a halogenated lactone. Other tetrahalomethanes containing at least one bromo or iodo atom are effective but less valuable than bromotrichloromethane.

The valuable adducts of the present invention are active against a number of fungi including, for example, *Alternaria solani*, the fungus responsible for early tomato blight. For the purpose of combatting this fungus, the compounds of the present invention may be suspended in an aqueous medium by the use of conventional emulsifying agents or dissolved in a solvent and sprayed on infected plants. A five percent aqueous acetone solution containing 400 p.p.m., of a compound of the present invention, such as the adduct of dimethyl itaconate and bromotrichloromethane, is effective as a spray for use on *Alternaria solani* infected tomato plants.

In accordance with the process of the present invention, bromotrichloromethane and itaconic acid diester reactants are heated to a temperature up to the reflux temperature for a period of time sufficient to provide an adequate yield of the desired 1:1 adduct. Times of the order of 3 to 15 hours are representative. In order to accelerate the reaction, it is necessary to employ a free radical generator type catalyst such as a peroxide catalyst, e.g., benzoyl peroxide. If desired, ultraviolet light may be used to initiate the reaction. In the case of employing a catalyst, a preferred temperature is, of course, one which decomposes the peroxide catalyst, i.e., a temperature above about 50° C. for most peroxide-type catalysts. Although higher concentrations of itaconic acid diester reactant may be employed, a preferred molar concentration is from about 0.1 to 0.8 mol of itaconic acid diester per mol of tetrahalomethane reactant. Use of higher molar ratios of itaconic acid diester generally tends to promote undesired vinyl-type polymerization of the itaconic acid diester.

Although the batch technique is satisfactory for the purpose of the process of the present invention, care must be taken to maintain a low itaconic acid diester concentration in the reaction mixture so as to prevent extensive polymerization. A low concentration of initiator helps to prevent loss of control of the reaction. The reaction is so vigorous when two mols of itaconic acid diester per mol of bromotrichloromethane are employed that temperature control is difficult and the yield amounts to but about 15–20%. Yield results can be improved to the order of 30–35% when the molar ratio of itaconic acid diester to bromotrichloromethane is of the order of from about 0.1 to 0.5:1.

A convenient means of maintaining a low concentration of itaconic acid diester in the reaction mixture, is to add a solution of itaconic acid diester and bromotrichloromethane in proper molar proportions or continuously to the reaction mixture. This avoids a high build-up of itaconic acid diester concentration and thereby prevents undesired vinyl polymerization while maintaining molar proportions permitting optimum yield results.

Excess of the bromotrichloromethane over that amount which reacts with the itaconic ester serves as a diluent for the reaction mixture. The excess is conveniently removed by distillation under vacuum. Although the product from dimethyl itaconate may be distilled to purify it, there is a tendency during distillation for partial decomposition when attempts are made to distill products from the higher esters. However, since the crude products are useful as fungicides, there is no need to distill the products.

The foregoing description and the examples appearing hereinafter are for the purpose of illustration only and not limiting to the scope of the invention which is set forth in the claims.

Example I

A mixture of 95 grams of dimethyl itaconate, 520 grams of bromotrichloromethane and 25 grams of benzoyl peroxide was heated cautiously to reflux. This caused a vigorous reaction with gas evolution. Heating was discontinued until the reaction subsided after which the mixture was again heated under reflux for six hours. At the end of six hours, excess bromotrichloromethane was distilled over at atmospheric pressure. After the removal of excess bromotrichloromethane a small amount of distillate was removed from the reacted mixture by distillation at a pressure of 25 mm. The residual product was then distilled at a pressure of 3 mm. by gradually raising the heating bath temperature to about 220° C. When the heating bath reached 220° C., distillation was discontinued.

The distillate was treated with 150 ml. of petroleum ether (boiling point 30–60° C.). After standing overnight, a crystalline product was collected by filtration of the treated distillate. A 50 gram yield of a product melting at 53–58° C. was obtained. Upon recrystallization, the 1:1 adduct product had a melting point of 58–60° C.

Example II

A solution was prepared containing 158 grams of dimethyl itaconate and 26 grams of bromotrichloromethane. A 50 ml. portion of this solution was added to an additional 400 grams of bromotrichloromethane and 12 grams of benzoyl peroxide to form a mixture which was refluxed for one-half hour. The remainder of the dimethyl itaconate-bromotrichloromethane solution was added in three equal portions at one-half hours intervals together with a 10 gram portion of benzoyl peroxide at each addition while maintaining reflux conditions. After the addition of the last equal portion, refluxing was continued for three hours. At the end of which time, excess bromotrichloromethane was distilled from the mixture. Residual product was then distilled at a pressure of 4.6 mm. until a vapor temperature of 200° C. was reached. The distillate collected contained 1:1 adduct of the reactants. The impure adduct was dissolved in 200 ml. of petroleum ether (boiling point 30 to 60° C.). After standing, a crystalline product was filtered from the petroleum ether. The yield of crystalline adduct melting at 59 to 61° C. was 110 grams.

*Analysis.*—Calcd. for $C_8H_{10}O_4BrCl_3$: C, 26.95; H, 2.83; Br. 22.4; Cl, 29.9. Found: C, 27.17; H, 2.83; Br., 22.3; Cl, 31.0.

*Example III*

A mixture of 121 grams of di-n-butyl itaconate, 500 grams of bromotrichloromethane and 21 grams of benzoyl peroxide was heated to reflux and cautiously refluxed for three and one-half hours. At the end of this time excess bromotrichloromethane was distilled off under vacuum. The residual adduct proved active as a fungicide.

*Example IV*

A mixture of 1 mole of di-n-propyl itaconate and 2 moles of bromotrichloromethane was mixed. A few drops of acetyl peroxide were added. The mixture was cautiously heated to reflux and refluxed for four hours. Excess bromotrichloromethane was distilled. The residue was effective as a fungicide.

What is claimed is:

1. The process of controlling fungal attack on plants which comprises contacting the plant with a fungicidal amount of a 1:1 adduct of bromotrichloromethane and an itaconic acid diester, the alcohol residues of said diester being alkyl and containing from 1 to 4 carbon atoms.

2. The process of claim 1 wherein said adduct is a 1:1 adduct of bromotrichloromethane and dimethyl itaconate.

3. The process of claim 1 wherein said adduct is the 1:1 adduct of bromotrichloromethane and di-n-butyl itaconate.

References Cited in the file of this patent

UNITED STATES PATENTS

| | | |
|---|---|---|
| 2,283,214 | Kyrides | May 19, 1942 |
| 2,485,099 | Kharasch | Oct. 18, 1949 |
| 2,515,306 | Ladd et al. | July 18, 1950 |
| 2,826,602 | Bortnick et al. | Mar. 11, 1958 |